W. F. L. FISCH.
HEATING MEANS FOR BAKING OVENS.
APPLICATION FILED AUG. 16, 1915.
1,268,337.
Patented June 4, 1918.
4 SHEETS—SHEET 4.
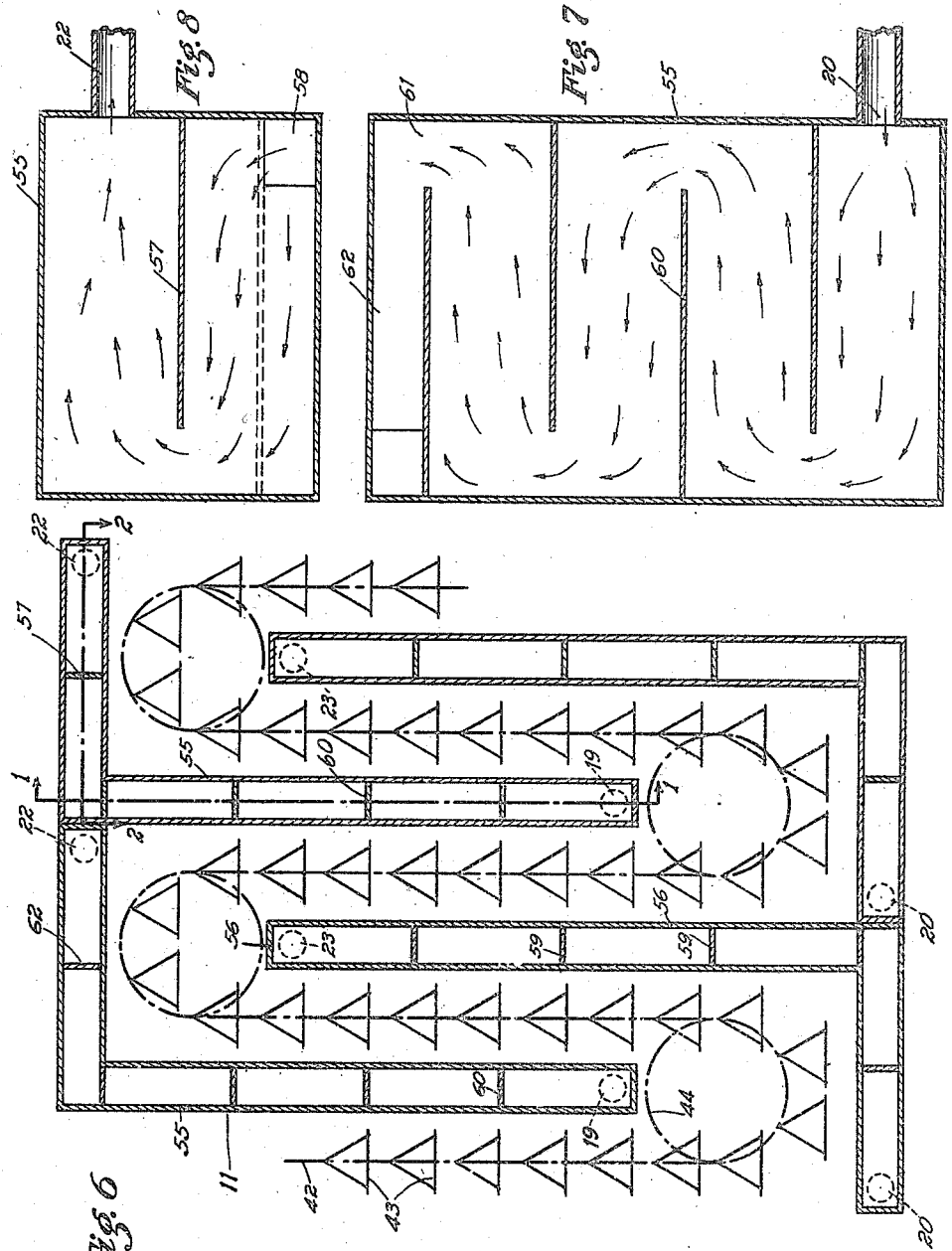
INVENTOR
W.F.L. Fisch
ATTORNEY

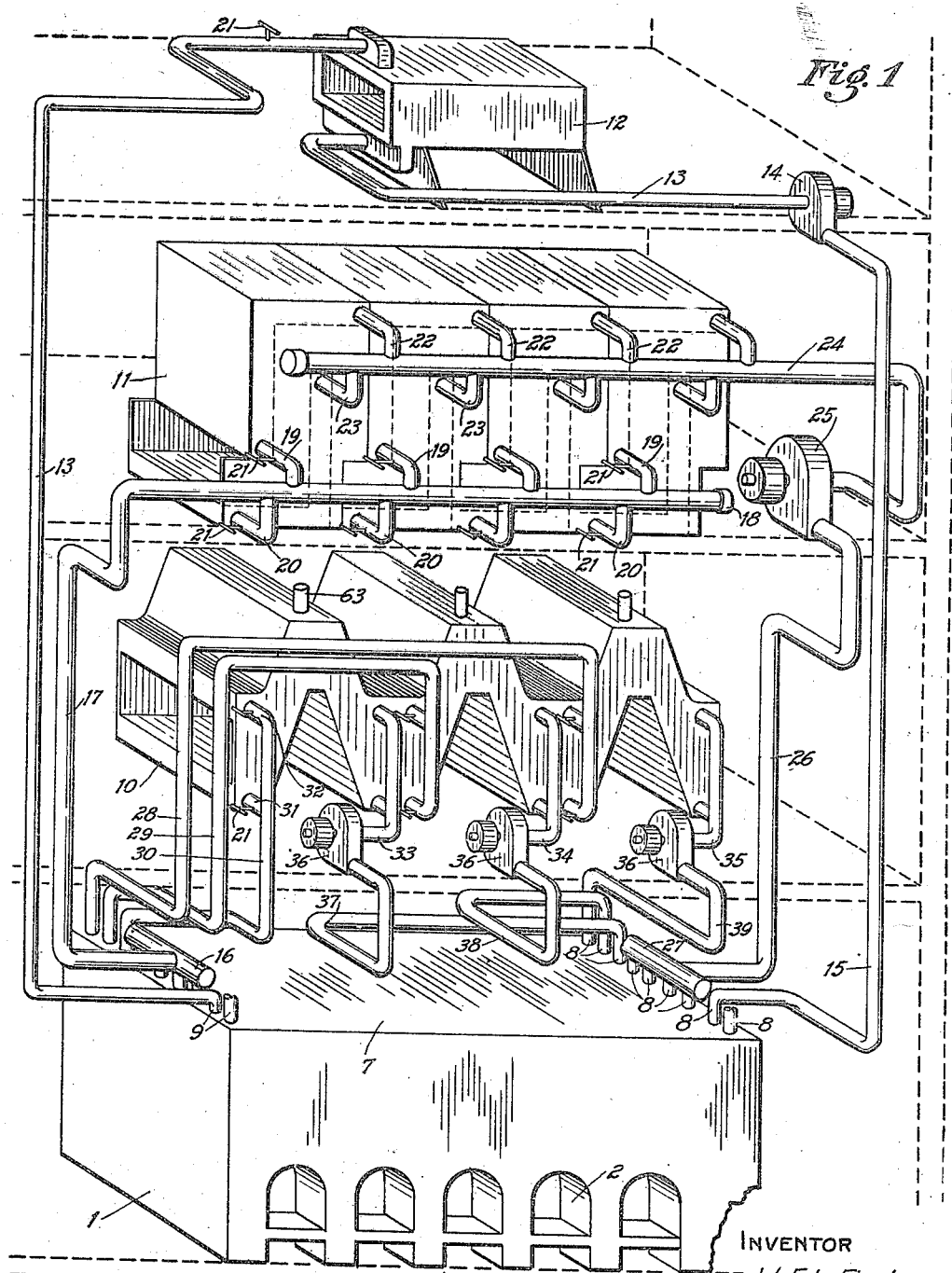

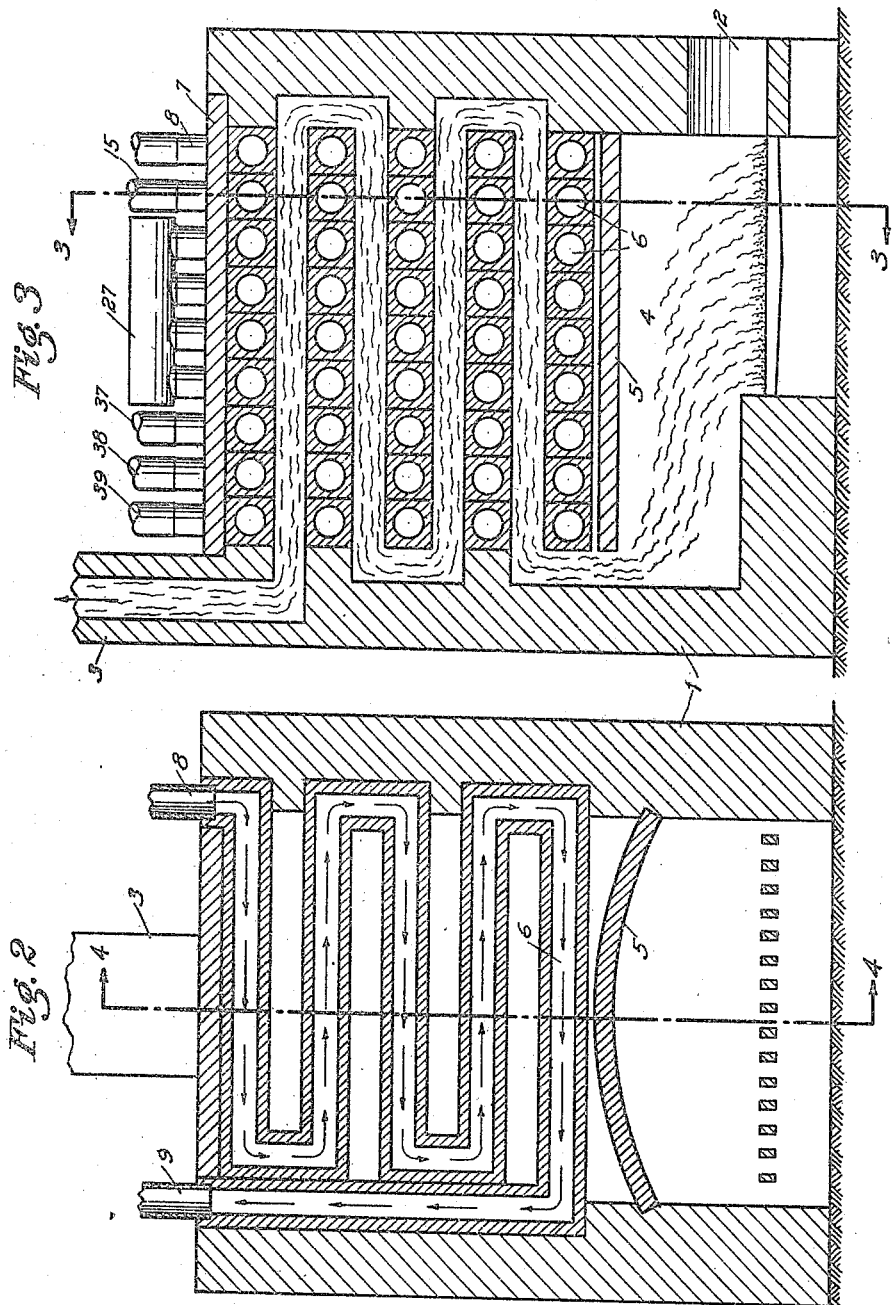

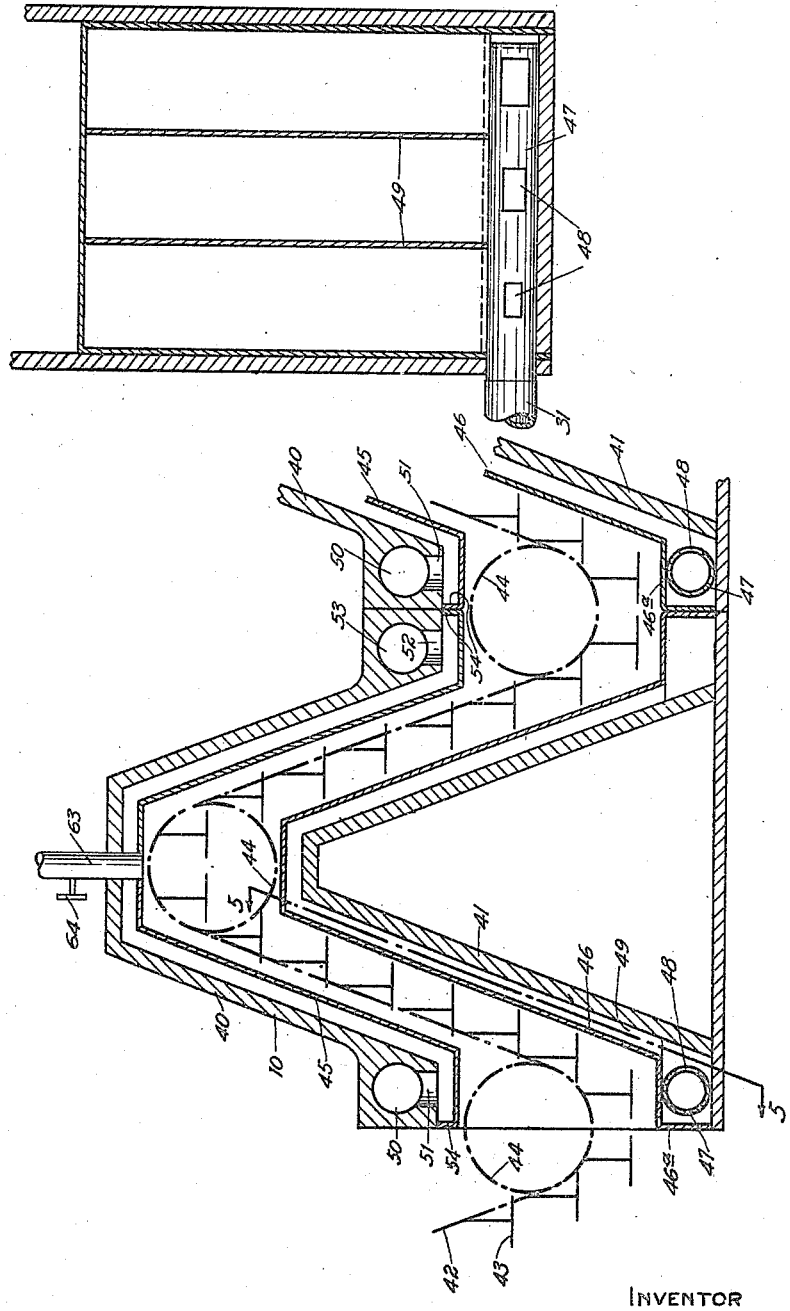

UNITED STATES PATENT OFFICE.

WILLIAM F. L. FISCH, OF BIRMINGHAM, ALABAMA.

HEATING MEANS FOR BAKING-OVENS.

1,268,337.  Specification of Letters Patent.  Patented June 4, 1918.

Application filed August 16, 1915. Serial No. 45,708.

*To all whom it may concern:*

Be it known that I, WILLIAM F. L. FISCH, a citizen of the United States of America, residing at Birmingham, in the county of Jefferson and State of Alabama, have invented certain new and useful Improvements in Heating Means for Baking-Ovens, of which the following is a specification.

My invention relates to a hot air heating apparatus for baking ovens.

As a fundamental basis of this invention I contemplate the creation of one or more circulating bodies of air or gas which are heated by radiation in the furnace and give out their heat by radiation into the baking chambers, so that the latter are free of air drafts which dry out the bread and bring into contact with it dust and foreign matter. Another great advantage of the use of this circulating system of hot air is that it involves a large economy in fuel and it permits the humidity of the air in the baking chamber or chambers to be more easily and accurately regulated.

A further object of my invention is to subdivide the circulating body of air into different circuits so that each circuit can be independently controlled and utilized and to this end I have conceived the idea of providing the furnace with a plurality of independent tubes or conduits of non-combustible material which are so arranged that they become highly heated by the combustion in the furnace and impart this heat to the circulating body of air passing therethrough. These several heating conduits or tubes are connected up with the different parts of a sectional or continuous baking oven or to different ovens, it being an important phase of my invention that I am enabled, if I so desire, to separate the baking ovens from the furnace, the hot air being conducted through non-conducting pipes to the several points of use which may be distributed throughout the bakery. The advantage of this arrangement is that I am enabled to use a single furnace for supplying heat for all purposes and to place the enormous weight of such a furnace in the basement or on the ground floor of the bakery where the same is most convenient for the fuel supply. The several baking units may be distributed on the different floor levels of the bakery where they will be supplied with heat for the baking process so that the latter can be most efficiently and economically conducted. When I refer to supplying heat for the several baking processes it will be understood that such processes include the supply of heat to the fermentation or proving chambers, as well as to various types of baking ovens or to different sections of a continuous baking oven. In order to carry my invention into effect however it is of especial importance that each circulating body of air be provided with a positive blower or fan means for inducing such circulation and that such means be capable of regulation so that the velocity or volume of flow of hot air in each circuit can be reliably controlled. In this connection it is also desirable to provide each circuit with damper or valve means to assist in its control and instead of hot air any other suitable gaseous medium may be employed as a heat conveyer and distributer.

Having thus broadly stated the objects which are contemplated by my present invention, I shall now describe, as required by law, what I regard as a practical and effective embodiment of the same, such embodiment being hereinafter more particularly described by reference to the accompanying drawings which form a part of this specification, and in which:—

Figure 1 is a general perspective view of a bakery equipped with a variety of baking apparatus distributed over different floors and provided with a ground floor furnace having distribution means for circulating the hot air from the furnace through the baking apparatus back to the furnace.

Fig. 2 is a transverse cross sectional view through the furnace on the line 3—3.

Fig. 3 is a cross-sectional view through the furnace on the line 4—4 of Fig. 2.

Fig. 4 is a longitudinal vertical sectional view through one section of the continuous oven shown in Fig. 1.

Fig. 5 is a partial cross-sectional view taken on the line 5—5 of Fig. 4.

Fig. 6 is a view similar to Fig. 4 of a modified form of oven.

Figs. 7 and 8 are cross-sectional views taken respectively on the lines 1—1 and 2—2 of Fig. 6.

Similar reference numerals refer to similar parts throughout the drawings.

The furnace 1 is of large size and has a number of fuel doors 2 and, as shown in Fig. 3, a smoke stack 3 and it is constructed of any suitable furnace material. Over the fire box 4 of the furnace is provided a transverse arch 5 extending from side to side and from the front to a point spaced from the rear wall of the furnace. Above this arch is arranged a lower tier of transverse heating flues 6, it being noted by reference to Fig. 2 that these flues are arranged in spaced tiers which subdivide the top portion of the furnace between the arch 5 and the top wall 7 so as to form a zig-zag smoke flue for the products of combustion which causes them to make a number of passes back and forth from front to rear of the furnace in moving from the fire box to the stack 3. The heating flues 6 are formed as separate pipes or conduits, each conduit being continuous from its respective inlet pipe 8 at one side of the top of the furnace to its respective outlet pipe 9 to the other side of the top of the furnace, this arrangement permitting the air in flowing from the conduit 8 to pipe 9 to pass in a zig-zag or circuitous course from side to side of the furnace and gradually approaching the fire box so that the air makes a number of passes transversely to the flow of the smoke and becomes gradually heated. Preferably these heating conduits 6 are made of fire tile or laid in brick so that they will form the baffles for the smoke but they may be formed in the baffles in any suitable manner, it being preferable to use material that will to an extent store heat and distribute it uniformly to the air flowing therethrough. It will also be noted that the circuit of air through each of the conduits 6 is distinct from that through the others but their arrangement transversely to the circuitous flow of the products of combustion will effect a uniform heating of the conduits and a consequent uniform radiation of such heat to the circulating air in the conduit.

Referring now to the distribution of the hot air circuits from the furnace to the baking appliances, I have shown a continuous oven 10 following the general characteristics of the oven which is described and claimed in my pending application Serial No. 839,970, and which is not therefore claimed in this application, except in so far as the same is modified for use with my continuous air heating circuits. On the floor above the oven 10 is provided another form of continuous oven 11 and on the floor above I provide a small over 12. The hot air circuit from the furnace to the oven 12 is conducted by a heat insulated conduit 13 leading on one side from the outlet pipe 9 of one of the heating flues 6 through an air space formed between the inner and outer walls of the oven 12 and is returned by means of the insulated pipe 13 and a blower 14 to a pipe 15 leading to the return pipe 8 of its respective flue 6. A greater amount of hot air being required to heat the continuous oven 11, the outlet pipes 9 from a plurality of conduits 6 are connected to a header 16, from which a conduit 17 leads with considerable capacity and passes in front of the continuous oven 11, having its outer end closed by a cap 18. The hot air is distributed from this pipe 17 by a manifold comprising two series of branch pipes 19 and 20, in each of which is provided a damper valve 21. A similar valve 21 is provided in the pipe 13. The return of hot air from the oven 11 is effected by means of two series of branch pipes 22 and 23 which open into the return pipe 24 that leads to a blower 25 which returns the hot air through a conduit 26 to a header 27 from which it returns to the inlet pipes 8 leading to the same flues 6 that connect with the header 16. The manner of circulating the hot air through this oven will be hereinafter described. The hot air is delivered to the oven 10 by means of three conduits 28, 29 and 30, the latter conduit being connected by upper and lower branch pipes 31 and 32 with the first section of the oven. The pipe 29 is connected by similarly designated branch pipes with the second section of the oven, and the pipe 28 with the third section of the oven. Damper valves 21 are provided in each of the branch pipes 31 and 32. The return of the hot air from the oven 10 is effected by means of three pipes 33, 34 and 35 which are connected by branch pipes with the upper and lower portions of the first, second and third sections, respectively, of the oven. I provide a separate blower 36 for each of the pipes 33, 34 and 35 and these blowers respectively return the air by means of pipes 37, 38 and 39 to the pipes 8, opening into the same flues 6 from which the pipes 28, 29 and 30 are supplied with hot air.

The construction of the ovens 10 and 12 are especially designed to reduce to a minimum the open air space in the oven in which the bread is baked. I have found by experience that the bread bakes better and has a better flavor and retains more moisture if not baked in an oven with too much air space and with too much air circulation. I have therefore designed these ovens so that the circulating air is excluded from the baking chamber and the latter is contracted to a minimum size which will permit the free passage of the conveyer for the bread.

Referring to Fig. 4, I illustrate in cross section the intermediate pyramidal section of the oven 10 which in this case is formed by an outer heat insulated wall 40 and by a similar inner wall 41. These walls are pyramidal in transverse cross section and spaced to provide between them an ample passageway for the endless conveyer 42 and the pans 43 suspended therefrom, and also for the sprocket wheels 44 which direct the conveyer about the turns in the baking passageway. This baking passageway is contracted on one side by a partition wall 45 and on the other side by a partition wall 46. These walls are formed of metal or radiating material, the wall 45 being disposed parallel with the outer wall 40 and spaced a few inches therefrom and continuing from side to side and from end to end of the section. In like manner, the wall 46 is parallel with the inner wall 41 and slightly spaced therefrom and extends from side to side and from end to end of the section. In effect these partition walls serve to shut off from the baking chamber circulating spaces through which the hot air is passed. Hot air from the inlet pipe 31 for this particular section is delivered to a pipe 47 which extends from front to rear of the oven and is housed in an angled extension 46$^a$ of the partition 46. This pipe is provided with a series of spaced outlet ports 48 which decrease in size as they approach the supply end of the pipe. The air passage between the walls 41 and 46 are subdivided by parallel partitions 49 which extend from the housing 46$^a$ on one side to the housing 46$^a$ on the other side and thus divide the inner air passage into parallel flues, one of which is opposite each port 48. Hot air is circulated through the outer walls of the oven by a pipe 32 delivering the same into a conduit 50 which extends from front to rear of the oven and is provided with one or more ports 51 which open into the space between the walls 40 and 45, through which space the air flows upwardly and then downwardly and is discharged through ports 52 and a conduit 53 to the return pipe 33, 34 or 35 as the case may be. The walls 45 for adjacent sections are provided with flanges 54 which engage the wall 40 so that the outer heating chambers for each oven section are maintained distinct and this same effect is obtained for the lower heating chambers by the portions 46$^a$ of the walls 46. The hot air after flowing under the wall 46 passes out into the pipe 33, 34 or 35 as the case may be to its respective controlling blower 36, which returns it through pipe 37, 38 or 39 to the furnace.

In the case of the oven 11 the interior thereof is subdivided by staggered partitions 55 and 56 which alternate and divide the oven into continuous vertical baking chambers, a sprocket wheel 44 being disposed below each partition 55 and above each partition 56 and serving to guide the conveyer 42 and the pans 43 in their zig-zag course continuously through the oven. In this case, as well as in the case of the oven 10, the baking chamber proper or passage is confined to a very narrow space and the hot air is circulated through the walls surrounding it in the following manner: The hot air is delivered from the pipe 20 into the lower horizontal end of the partition 56 forming the bottom of the oven section and after passing around a baffle 57 therein the air passes out through a port 58 into the vertical portion of the partition 56 and in flowing through this it is diverted by horizontal staggered baffles 59 and caused to flow in a circuitous course back and forth until it passes out through the pipe 23 to the header 24. In like manner the hot air for heating the partitions 55 and their horizontal extensions forming the top of the baking chamber is provided for by the admission of hot air through the pipes 19 into the lower end of the partitions 55 and flowing upwardly therethrough around staggered baffles 60 through an outlet port 61 into the top and there flows about a baffle 62 to the outlet pipe 22 and thence to the header 24.

In the case of the oven 12 the air circulates in any desired manner between the inner and outer walls of the oven.

I provide each section of the oven 10 with an outlet flue 63 leading from the baking chamber through the inner wall 45 and through the outer wall 40 and I provide a valve 64 therein so that I can independently provide for the discharge of excess steam or heat from the several sections. If desired a similar provision may be made in the case of the oven 11.

In operation, the furnace 1 is fired in the customary manner and the circulation of the products of combustion about the heating flues 6 will bring the latter quickly and substantially uniformly to a high temperature. All of the distribution pipes 13, 17, 28, 29 and 30 and their respective return pipes are insulated to prevent any substantial radiation of heat and if it is desired to use the oven 12 the damper 21 is opened and the fan 14 started in service with the result that a positive circulation of hot air is produced through the pipes 13 and 15 and caused to pass as a distinct circuit through one of the heating flues 6. If it is desired to increase or diminish the heat to this oven it is accomplished by the adjustment of this damper valve 21 or by a control of the speed of blower 14.

If the oven 11 is in service the blower 25 is started and hot air is circulated through the furnace from the header 27 to the header 16 and is distributed from the latter through pipes 17, 19 and 20 to the hollow partitions forming the walls of the zig-zag baking chamber. It will be noticed that each of the pipes 19 and 20 is provided with separate valves 21 so that the volume of hot air flowing through the walls of each section of the oven can be independently regulated so as to vary the temperature therein in accordance with the baking requirements. In like manner the hot air is supplied to the several sections of the baking oven 10 by the pipes 28, 29 and 30 and is independently controlled to each section not only by means of the dampers 21 in the pipes 31 and 32, but also by the provision of an independent blower 36 for each oven section, thus giving a greater range of control than in the case of the oven 11 where a single fan is used to exhaust the several sections. Inasmuch as the air in the several circuits is maintained independent in its passage through the furnace, it will be obvious that each flue 6 constitutes in reality a separate heater and thus the circulation conditions that may be desirable in one or more of the circuits do not affect the circulation conditions which are obtained by regulation in the other circuits. In reference to the baking of the loaves, it will be noted that the pans are moved through very narrow baking passages in which the air space is so restricted and in which the circulation of air is so slight that the bread is not dried and it does not lose its flavor. By means of the regulation of the heater I am enabled with my sectional ovens to so control the baking as to produce bread of as high quality as produced in the old time oven and at the same time to produce this result with greater uniformity and with marked economy in respect of both labor and floor space. Moreover the exclusion of the circulating hot air from the baking chambers proper enables me to increase the moisture in one section without affecting the moisture in the other sections, this being desirable in order to subject the bread to a higher temperature and more moisture in the first than in the latter stages of baking.

The continuous conveyer is arranged to pass only the loaded pans through the ovens, the empty pans being returned outside of the baking chamber so that the top and bottom oven walls can be brought close to the loaves and the oven space reduced to a minimum.

Having thus described my invention, what I claim as new and desire to secure by Letters Patent, is:—

1. In combination, a plurality of baking chambers, a common furnace for heating said chambers, a piping system comprising multiple circuits to circulate a heat distributing medium from said furnace to the several chambers, and instrumentalities, including blowers and valves to positively induce and to independently control each of said circulations.

2. In a baking apparatus, a plurality of baking units, a closed passage in each unit through which a heating medium is passed, a separate piping circuit to each unit, a furnace to heat the medium in each circuit, blower means in the circuit to each unit to positively induce and regulate its respective circulation, and valve means in each circuit.

3. In a baking apparatus, a common hot air furnace, a plurality of separate and distinct hot air flues passing therethrough, artificial means to induce a continuous circulation through each flue to a given point of use and back to the furnace, and ovens distributed at points remote from the furnace and supplied with heat therefrom by said flues.

4. In a baking apparatus, a plurality of baking chambers, hollow walls for said chambers, a piping system forming a closed circuit to each chamber, a common furnace for heating said piping system, and a blower and valve in each circuit to independently control the circulation therein.

5. In a baking apparatus, a plurality of separate baking chambers, a closed circuit piping system connected with each baking chamber and adapted to heat the same, blower and valve means to independently control the heat for each baking chamber by controlling the circulation of air through the piping system leading thereto, and a common hot air furnace for the piping system, substantially as described.

6. In a baking apparatus, a plurality of baking chambers, independently controllable means to heat each chamber, said means comprising hollow chamber walls, a furnace, and a closed piping circuit leading through the furnace and connected to each chamber, the several pipe circuits where they pass through the furnace being disposed transversely to the flow of the products of combustion and arranged to form staggered baffles about which the products of combustion flow with a circuitous course, substantially as described.

In testimony whereof I affix my signature.

WILLIAM F. L. FISCH.

Witness:
  NOMIE WELSH.

Copies of this patent may be obtained for five cents each, by addressing the "Commissioner of Patents, Washington, D. C."